(12) United States Patent
O'Brien, III et al.

(10) Patent No.: US 9,916,371 B1
(45) Date of Patent: Mar. 13, 2018

(54) METHODS COMPUTER READABLE MEDIA, AND SYSTEMS FOR COPYING DATA BETWEEN MIRRORED SYSTEMS

(75) Inventors: Walter A. O'Brien, III, Westborough, MA (US); Dennis Duprey, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 12/981,772

(22) Filed: Dec. 30, 2010

(51) Int. Cl.
*G06F 17/30* (2006.01)

(52) U.S. Cl.
CPC .............. *G06F 17/30575* (2013.01)

(58) Field of Classification Search
CPC ................................ G06F 17/30575
See application file for complete search history.

(56) References Cited

U.S. PATENT DOCUMENTS

| | | | |
|---|---|---|---|
| 7,529,781 B2 | 5/2009 | Frey et al. | |
| 7,617,365 B2 | 11/2009 | Zhang et al. | |
| 8,713,359 B1 | 4/2014 | Krikellas et al. | |
| 9,448,732 B1 | 9/2016 | Sahin et al. | |
| 2006/0129608 A1* | 6/2006 | Sato et al. | 707/200 |
| 2007/0192554 A1* | 8/2007 | Higaki et al. | 711/162 |
| 2009/0132775 A1* | 5/2009 | Otani et al. | 711/162 |
| 2010/0205161 A1* | 8/2010 | Turner | 707/697 |
| 2010/0287338 A1* | 11/2010 | An | 711/114 |
| 2012/0016840 A1* | 1/2012 | Lin et al. | 707/626 |

* cited by examiner

*Primary Examiner* — Grace Park
(74) *Attorney, Agent, or Firm* — BainwoodHuang

(57) ABSTRACT

A method includes receiving a copy command, by a primary data storage device, to copy a data portion stored on the primary data storage device to another location on the primary data storage device; determining, with a mirroring module, whether a local copy of the data portion is stored on a secondary data storage device and whether the another location on the primary data storage device is mirrored by the secondary data storage device, the secondary data storage device at least partially mirroring the primary data storage device; and if the local copy of the data portion is stored on the secondary data storage device and the another location is mirrored by the secondary data storage device, sending a second command to the secondary data storage device to copy the local copy of the data portion to another location on the secondary data storage device.

13 Claims, 6 Drawing Sheets

METHODS COMPUTER READABLE MEDIA, AND SYSTEMS FOR COPYING DATA BETWEEN MIRRORED SYSTEMS

TECHNICAL FIELD

The description generally relates to methods, computer readable media, and systems for copying data between mirrored systems. More particularly, the description relates to reducing the data transmitted between mirrored data storage devices when copying data.

BACKGROUND

Storing and safeguarding electronic data is of paramount importance in modern business. Various systems have been employed to protect such electronic data. Data storage systems can fall into a plurality of categories, such as Network Attached Storage (NAS) and Storage Area Networks (SAN). A NAS system can be a stand-alone, network-accessible, storage device that can provide file-level access to electronic data. A SAN array can be a dedicated storage system that can connect numerous storage resources to one or many hosts. A SAN can provide block-level access to electronic data through one or more SCSI-based protocols (e.g., Fiber Channel or iSCSI), which can be used by a connected host to provide a file system.

Data storage systems can be employed that contain multiple data storage devices. Data storage systems can provide some level of redundancy by use of mirrored or redundant components (e.g., storage devices, disk drives, disk controllers, power supplies and/or fans), each of which can be hot-swappable to avoid downtime.

One approach has been the development of data storage systems that behave as if they were a single storage device, but are in reality multiple storage devices that collectively operate together. From the perspective of a host that issues commands to read, write, copy, and/or allocate data storage, these devices appear as a single data storage entity. Examples of such data storage devices include disk storage arrays and network storage arrays.

A collection of data storage devices acting in concert can be configured to operate in a way that provides redundancy. For example, multiple disks can be organized into redundant arrays of inexpensive disks (RAID) groups. RAID groups can provide mirroring or other forms of duplication wherein data written to one disk is also written to another disk as a backup copy. RAID groups can also distribute data across many disks so that if one of the disks fails, there is enough data left on the other disks to reconstruct the missing data. RAID groups can perform a combination of striping and mirroring. Similarly, data storage devices can provide mirroring wherein data written to one data storage device is also written to another data storage device as a backup copy.

A common problem that arises in data storage systems that perform mirroring or other forms of backup or duplication is the delay incurred when transferring data between mirrored data storage devices. Mirroring systems typically have at least two data storage devices, e.g., two disks, two RAID groups, etc., one to store the data and the other to store the backup copy of the data, commonly referred to as the primary and secondary data storage devices, respectively. In order to provide a backup copy of data, any data that is stored on the primary data storage device must also be stored on the secondary data storage device.

In some applications, data can be copied from the primary data storage device to another location on the primary data storage device. Conventional approaches to mirroring perform the copy on the primary data storage device. If the destination of the copied data is mirrored by the secondary data storage device, the copied data is sent to the secondary data storage device. Sending all of the data to be mirrored from the primary data storage device to the secondary data storage device can involve significant transmission times for storage devices joined by slow network connections or separated by large distances. Accordingly, there exists a need for methods, computer readable media, and systems for reducing the amount of data transmitted between mirrored data storage devices.

SUMMARY

In general, in one aspect there is a method. The method can include receiving a copy command, by a primary data storage device, to copy a data portion stored on the primary data storage device to another location on the primary data storage device. The method can include determining, with a mirroring module, whether a local copy of the data portion is stored on a secondary data storage device and whether the another location on the primary data storage device is mirrored by the secondary data storage device, the secondary data storage device at least partially mirroring the primary data storage device; and if the local copy of the data portion is stored on the secondary data storage device and the another location on the primary data storage device is mirrored by the secondary data storage device, sending, from the mirroring module, a second command to the secondary data storage device to copy the local copy of the data portion to another location on the secondary data storage device.

In some embodiments, the data portion is stored on a first logical unit of the primary data storage device and the another location on the primary data storage device is a second logical unit of the primary data storage device. In some embodiments the first logical unit and the second logical unit are the same logical unit.

In some embodiments, determining, with the mirroring module, whether the local copy of the data portion is stored on the secondary data storage device and the another location on the primary data storage device is mirrored by the secondary data storage device includes determining, with the mirroring module, whether the secondary data storage device mirrors the first logical unit and the second logical unit.

In some embodiments, the method includes copying, with the primary data storage device, the data portion to the another location on the primary data storage device, and if the local copy of the data portion is stored on the secondary data storage device and the another location on the primary data storage device is mirrored by the secondary data storage device, copying, with the secondary data storage device, the local copy of the data portion to the another location on the secondary data storage device.

In some embodiments, the method includes copying, with the primary data storage device, the data portion to the another location on the primary data storage device, and if the local copy of the data portion is stored on the secondary data storage device and the another location on the primary data storage device is mirrored by the secondary data storage device, delaying copying, with the secondary data storage device, the local copy of the data portion to the another location on the secondary data storage device until a predetermined event.

In general, in another aspect there is a computer program product, tangibly embodied in a non-transitory computer readable storage medium. The computer program product can include instructions being operable to cause one or more data processing apparatus to receive a copy command, by a primary data storage device, to copy a data portion stored on the primary data storage device to another location on the primary data storage device. The computer program product can include instructions being operable to cause one or more data processing apparatus to determine, with a mirroring module, whether a local copy of the data portion is stored on a secondary data storage device and whether the another location on the primary data storage device is mirrored by the secondary data storage device, the secondary data storage device at least partially mirroring the primary data storage device, and if the local copy of the data portion is stored on the secondary data storage device and the another location on the primary data storage device is mirrored by the secondary data storage device, send, from the mirroring module, a second command to the secondary data storage device to copy the local copy of the data portion to another location on the secondary data storage device.

In some embodiments, the data portion is stored on a first logical unit of the primary data storage device and the another location on the primary data storage device is a second logical unit of the primary data storage device. In some embodiments the first logical unit and the second logical unit are the same logical unit.

In some embodiments, the instructions being operable to cause one or more data processing apparatus to determine, with the mirroring module, whether the local copy of the data portion is stored on the secondary data storage device and the another location on the primary data storage device is mirrored by the secondary data storage device include instructions to determine, with the mirroring module, whether the secondary data storage device mirrors the first logical unit and the second logical unit.

In some embodiments, the computer program product includes instructions being operable to cause one or more data processing apparatus to copy, with the primary data storage device, the data portion to the another location on the primary data storage device, and if the local copy of the data portion is stored on the secondary data storage device and the another location on the primary data storage device is mirrored by the secondary data storage device, copy, with the secondary data storage device, the local copy of the data portion to the another location on the secondary data storage device.

In some embodiments, the computer program product includes instructions being operable to cause one or more data processing apparatus to copy, with the primary data storage device, the data portion to the another location on the primary data storage device, and if the local copy of the data portion is stored on the secondary data storage device and the another location on the primary data storage device is mirrored by the secondary data storage device, delay copying, with the secondary data storage device, the local copy of the data portion to the another location on the secondary data storage device until a pre-determined event.

In general, in another aspect, there is a method. The method can include receiving a copy command, by a first primary data storage device, to copy a data portion stored on the first primary data storage device to a location on a second primary data storage device. The method can include determining, with a mirroring module, whether a local copy of the data portion is stored on a secondary data storage device and whether the location on the second primary data storage device is mirrored by the secondary data storage device, the secondary data storage device at least partially mirroring the first primary data storage device and the second primary data storage device, and if the local copy of the data portion is stored on the secondary data storage device and the location on the second primary data storage device is mirrored by the secondary data storage device, sending, from the mirroring module, a second command to the secondary data storage device to copy the local copy of the data portion to another location on the secondary data storage device.

In some embodiments, the data portion is stored on a first logical unit of the first primary data storage device and the location on the second primary data storage device is a second logical unit of the second primary data storage device.

In some embodiments, determining, with the mirroring module, whether the local copy of the data portion is stored on the secondary data storage device and the another location on the primary data storage device is mirrored by the secondary data storage device includes determining, with the mirroring module, whether the secondary data storage device mirrors the first logical unit and the second logical unit.

In some embodiments, the method includes copying, with the second primary data storage device, the data portion to the location on the second primary data storage device, and if the local copy of the data portion is stored on the secondary data storage device and the location on the second primary data storage device is mirrored by the secondary data storage device, copying, with the secondary data storage device, the local copy of the data portion to the another location on the secondary data storage device.

In some embodiments, the method includes copying, with the second primary data storage device, the data portion to the location on the second primary data storage device, and if the local copy of the data portion is stored on the secondary data storage device and the location on the second primary data storage device is mirrored by the secondary data storage device, delaying copying, with the secondary data storage device, the local copy of the data portion to the another location on the secondary data storage device until a pre-determined event.

In general, in another aspect, there is a computer program product, tangibly embodied in a non-transitory computer readable storage medium. The computer program can include instructions being operable to cause one or more data processing apparatus to receive a copy command, by a first primary data storage device, to copy a data portion stored on the first primary data storage device to a location on a second primary data storage device. The computer program can include instructions being operable to cause one or more data processing apparatus to determine, with a mirroring module, whether a local copy of the data portion is stored on a secondary data storage device and whether the location on the second primary data storage device is mirrored by the secondary data storage device, the secondary data storage device at least partially mirroring the first primary data storage device and the second primary data storage device, and if the local copy of the data portion is stored on the secondary data storage device and the location on the second primary data storage device is mirrored by the secondary data storage device, send, from the mirroring module, a second command to the secondary data storage device to copy the local copy of the data portion to another location on the secondary data storage device.

In some embodiments, the instructions being operable to cause one or more data processing apparatus to determine, with the mirroring module, whether a local copy of the data portion is stored on a secondary data storage device and whether the location on the second primary data storage device is mirrored by the secondary data storage device includes instructions to determine, with the mirroring module, whether the secondary data storage device mirrors the first logical unit and the second logical unit.

In some embodiments, the computer program product includes instructions being operable to cause one or more data processing apparatus to copy, with the second primary data storage device, the data portion to the location on the second primary data storage device, and if the local copy of the data portion is stored on the secondary data storage device and the location on the second primary data storage device is mirrored by the secondary data storage device, copy, with the secondary data storage device, the local copy of the data portion to the another location on the secondary data storage device.

In some embodiments, the computer program product includes instructions being operable to cause one or more data processing apparatus to copy, with the second primary data storage device, the data portion to the location on the second primary data storage device, and if the local copy of the data portion is stored on the secondary data storage device and the another location on the second primary data storage device is mirrored by the secondary data storage device, delay copying, with the secondary data storage device, the local copy of the data portion to the another location on the secondary data storage device until a predetermined event.

In general, in another aspect there is a system. The system can include a mirroring module. The system can include a primary data storage device in communication with the mirroring module. The system can include a secondary data storage device in communication with the primary data storage device and the mirroring module and at least partially mirroring the primary data storage device, the primary data storage device configured to receive a copy command to copy a data portion stored on the primary data storage device to another location on the primary data storage device, the mirroring module configured to send a second command to the secondary data storage device to copy a local copy of the data portion to another' location on the secondary data storage device if the local copy of the data portion is stored on the secondary data storage device and the another location on the primary data storage device is mirrored by the secondary data storage device.

In general, in another aspect there is a system. The system can include a means for receiving a copy command to copy a data portion stored on a primary data storage device to another location on the primary data storage device. The system can include a means for determining whether a local copy of the data portion is stored on a secondary data storage device and whether the another location on the primary data storage device is mirrored by the secondary data storage device, the secondary data storage device at least partially mirroring the primary data storage device. The system can include a means for sending a second command to the secondary data storage device to copy the local copy of the data portion to another location on the secondary data storage device if the local copy of the data portion is stored on the secondary data storage device and the another location on the primary data storage device is mirrored by the secondary data storage device.

In some embodiments, the copy command is an EXTENDED COPY SCSI command.

In some embodiments, the data portion is one or more files.

In some embodiments, the data portion is stored on a first logical unit of the primary data storage device and the another location on the primary data storage device is a second logical unit of the primary data storage device. In some embodiments the first logical unit and the second logical unit are the same logical unit.

BRIEF DESCRIPTION OF THE DRAWINGS

The advantages of the methods, computer readable media, and systems described above, together with further advantages, can be better understood by referring to the following description taken in conjunction with the accompanying drawings. The drawings are not necessarily to scale, emphasis instead being placed upon the principles of the methods, computer readable media, and systems.

DETAILED DESCRIPTION

Figure 1A:
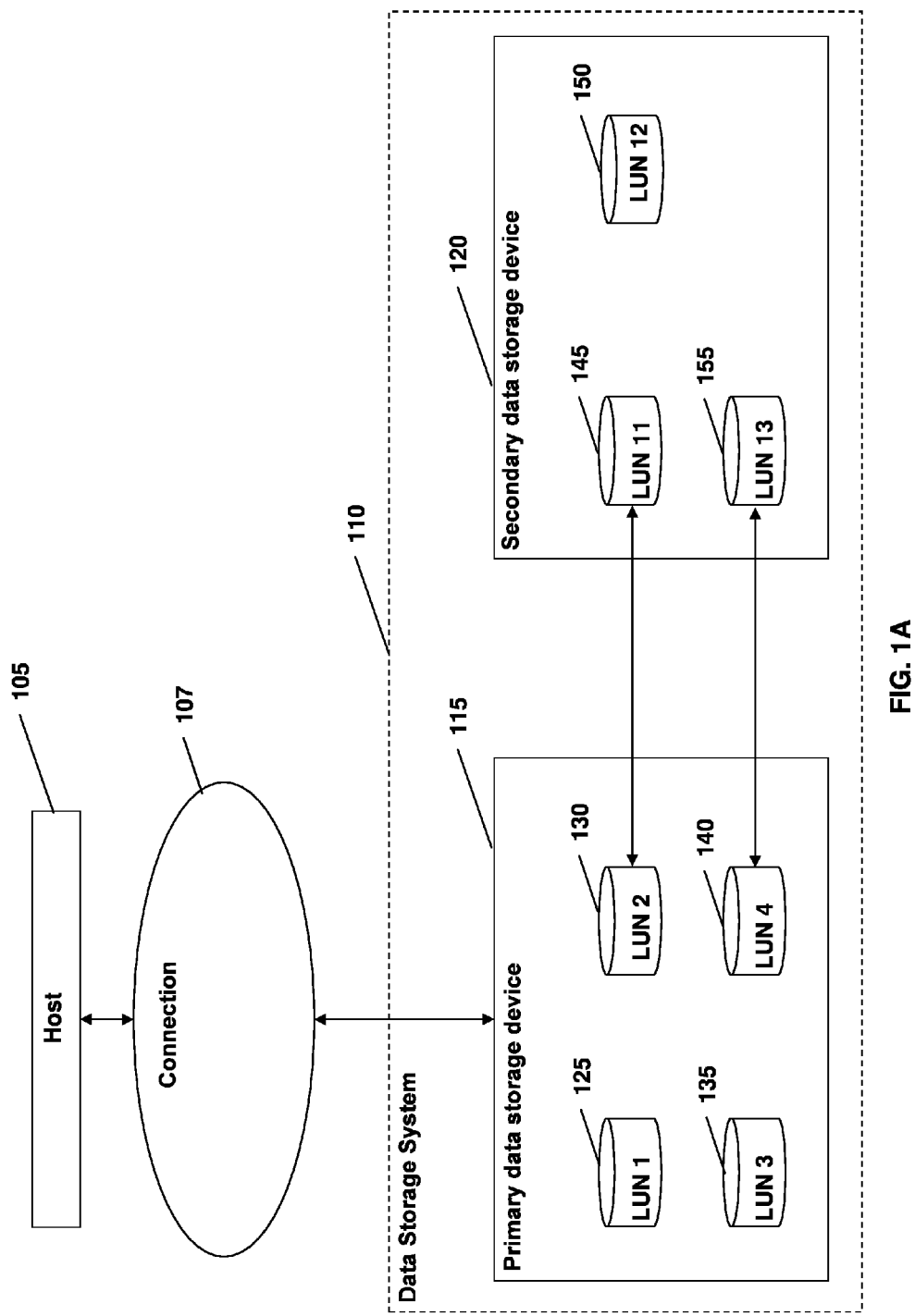
FIG. 1A depicts a host coupled via a connection to a data storage system.

In accordance with the subject matter disclosed herein, methods, computer readable media, and systems are described for reducing the data transmitted between mirrored data storage devices when copying data on the primary data storage device. FIG. 1A depicts a host 105 coupled via connection 107 to a data storage system 110. The host 105 can send various commands to the data storage system 110, such as, for example, data write requests (e.g., a request that data be written to the data storage system 110), data read requests (e.g., a request that data be read from the data storage system 110), and data copy requests (e.g., a request that a copy of data currently stored on the data storage system 110 be written to the data storage system 110).

The host 105 can be any device capable of communicating with the data storage system 110. For example, the host 105 can be a server, a personal computer, a mobile computing device, or a virtual machine running on any one of these.

As depicted in FIG. 1A, the host 105 is coupled via the connection 107 with the data storage system 110. For example, the host 105 can be connected to the data storage system 110 via a fiber channel network or fabric. The host 105 can be connected to the data storage system 110 via a hardwired network connection, such as an Ethernet connection. The host 105 can be connected to the data storage system 110 via a wireless communication channel running any of various protocols, such as, for example, IEEE 802.11a, 802.11b, 802.11g, Wi-Fi, and/or Bluetooth.

The data storage system 110 can include a primary data storage device 115 and a secondary data storage device 120. The primary data storage device 115 can have one or more logical units, such as logical units 125, 130, 135, and 140. The secondary data storage device 120 can have one or more logical units, such as logical units 145, 150, and 155. Each logical unit 125, 130, 135, 140, 145, 150, and 155 can also be assigned a logical unit number ("LUN"), as illustrated in FIG. 1 (e.g., "LUN 1" or "LUN 11"). The primary data storage device 115 and the secondary data storage device 120 can be connected via, for example, any of the aforementioned networking methods.

Figure 1B:
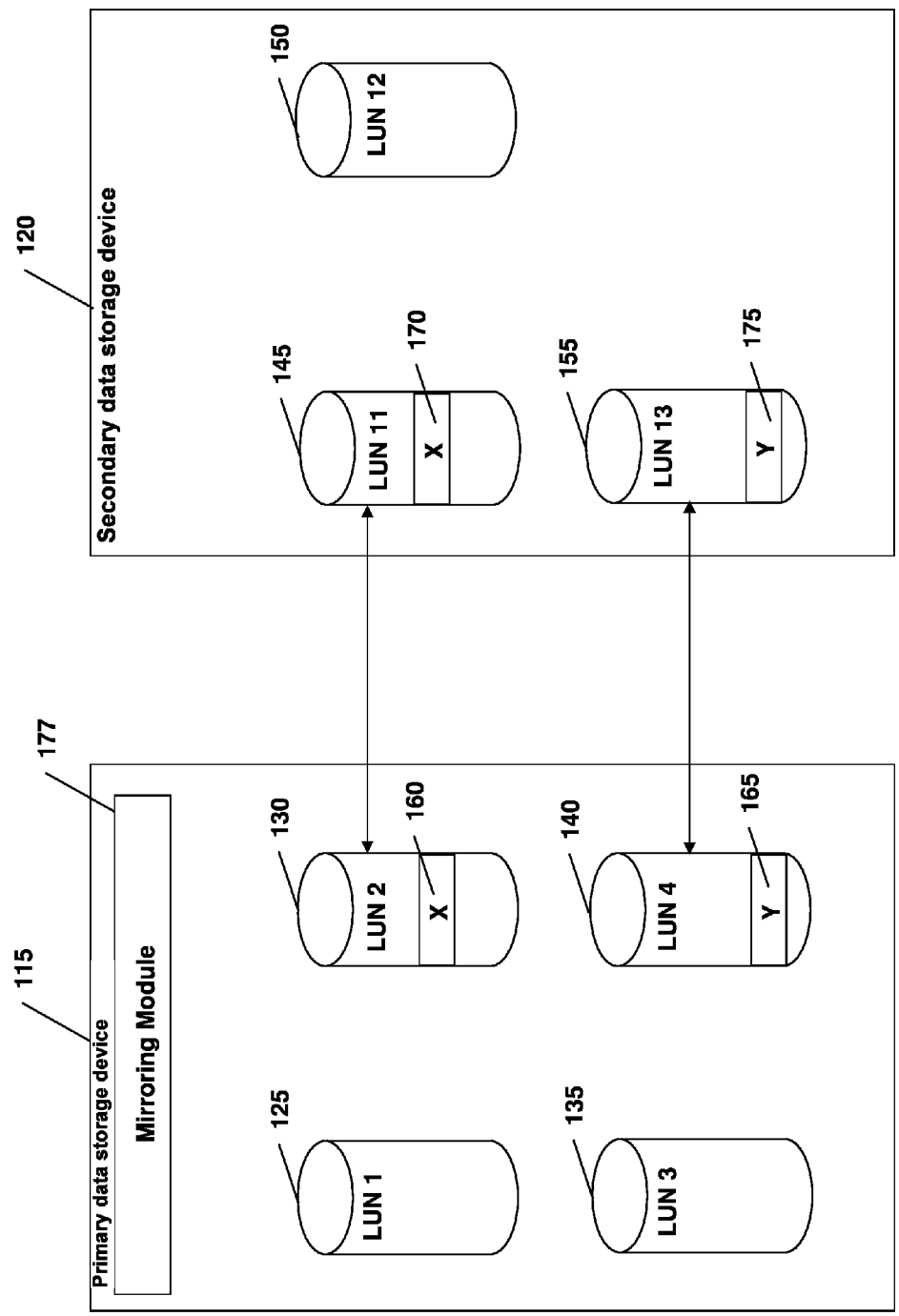
FIG. 1B depicts the primary data storage device and the secondary data storage device of FIG. 1A, data portions stored on the primary data storage device or the secondary data storage device, and the mirroring relationship between the primary data storage device and the secondary data storage device.

FIG. 1B depicts the primary data storage device 115 and the secondary data storage device 120 of FIG. 1A, data portions 160, 165, 170, and 175 stored on the primary data storage device 115 or the secondary data storage device 120, and the mirroring relationship between the primary data storage device 115 and the secondary data storage device 120. In some embodiments, the logical units 125, 130, 135, 140, 145, 150, and 155 store data, such as, for example, the data portions 160, 165, 170, and 175. For purposes of illustration, data portions shown with the same letter (e.g., 'X' on the data portions 160 and 170 and 'Y' on the data portions 165 and 170) contain the same data.

The methods, computer readable media, and systems described herein can be used with data portions, such as, for example, the data portions 160, 165, 170, and 175, of any size. In some embodiments, a data portion can be one or more bytes of data. In some embodiments, a data portion can be one or more blocks of data, where the size of the block is determined by the particular embodiment. For example, the block can be 512 bytes. In some embodiments, the data portion can be a file. In some embodiments, the data portion is not stored on the primary storage device 115 in physically contiguous blocks.

The primary data storage device 115 can receive a command to copy data (e.g., the data portion 160 or 165) stored on the primary data storage device 115 to another location on the primary storage device 115. In some applications, the command can be to copy data stored on a logical unit on the primary data storage device 115 (e.g., the logical unit 125, 130, 135, or 140) to another logical unit on the primary data storage device 115. In some applications, the command can be to copy data stored on a logical unit on the primary data storage device 115 to the same logical unit. In some applications, the command can be the EXTENDED COPY SCSI command. In some applications, the command can be in any format that instructs the primary data storage device 115 to copy a data portion from one location on the primary data storage device 115 to another location on the primary data storage device 115. In some applications, the command can specify one or more data portions to copy, such as one or more bytes, blocks, or files.

The secondary data storage device 120 can mirror some or all of the data stored on the primary data storage device 115. The primary data storage device 115 and the secondary data storage device 120 can be synchronously or asynchronously mirrored. For example, the secondary data storage device 120 can store an exact copy of some or all of the data stored on the primary data storage device 115. In the illustrated embodiment, the logical unit 145 on the secondary data storage device 120 mirrors the logical unit 130 on the primary data storage device 115. Similarly, the logical unit 155 on the secondary data storage device 120 mirrors the logical unit 140 on the primary data storage device 115. In the illustrated embodiment, the secondary storage device 120 does not mirror the logical units 125 and 135 on the primary data storage device 115. While the mirroring described is logical-unit-based, the methods, computer readable media, and systems described can be used for implementing mirroring on another basis, such as, for example, file-based mirroring. Additionally, the methods, computer readable media, and systems described can be used in mirroring configurations where more than one secondary data storage device mirrors a primary data storage device.

In some embodiments, a mirroring module 177 maintains the mirroring relationships between the primary data storage device 115 and the secondary data storage device 120. The mirroring module can, for example, cause changes to the data stored on the primary data storage device 115 to be propagated to and reflected by the data stored on the secondary data storage device 120. The mirroring module 177 can be implemented in hardware or software. In some embodiments, the mirroring module 177 can be part of the primary data storage device 115. In some embodiments, the mirroring module can be part of a separate device (not shown) that is in communication with the primary data storage device 115 and the secondary data storage device 120.

In the illustrated embodiment, the primary data storage device 115 includes the mirroring module 177 and maintains the mirroring relationships between the primary data storage device 115 and the secondary data storage device 120. Using the mirroring module, the primary data storage device 115 can determine whether any of the data that it stores is mirrored by the secondary data storage device 120. In some embodiments, the primary data storage device 115 stores information about the mirroring relationship between the primary data storage device 115 and the secondary data storage device 120. For example, the primary data storage device 115 can store the mirroring relationship between logical units on the primary data storage device 115 and logical units on the secondary data storage device 120. The primary data storage device 115 can, for example, store that "LUN 11" (logical unit 145) mirrors "LUN 2" (logical unit 130).

Figure 1C:
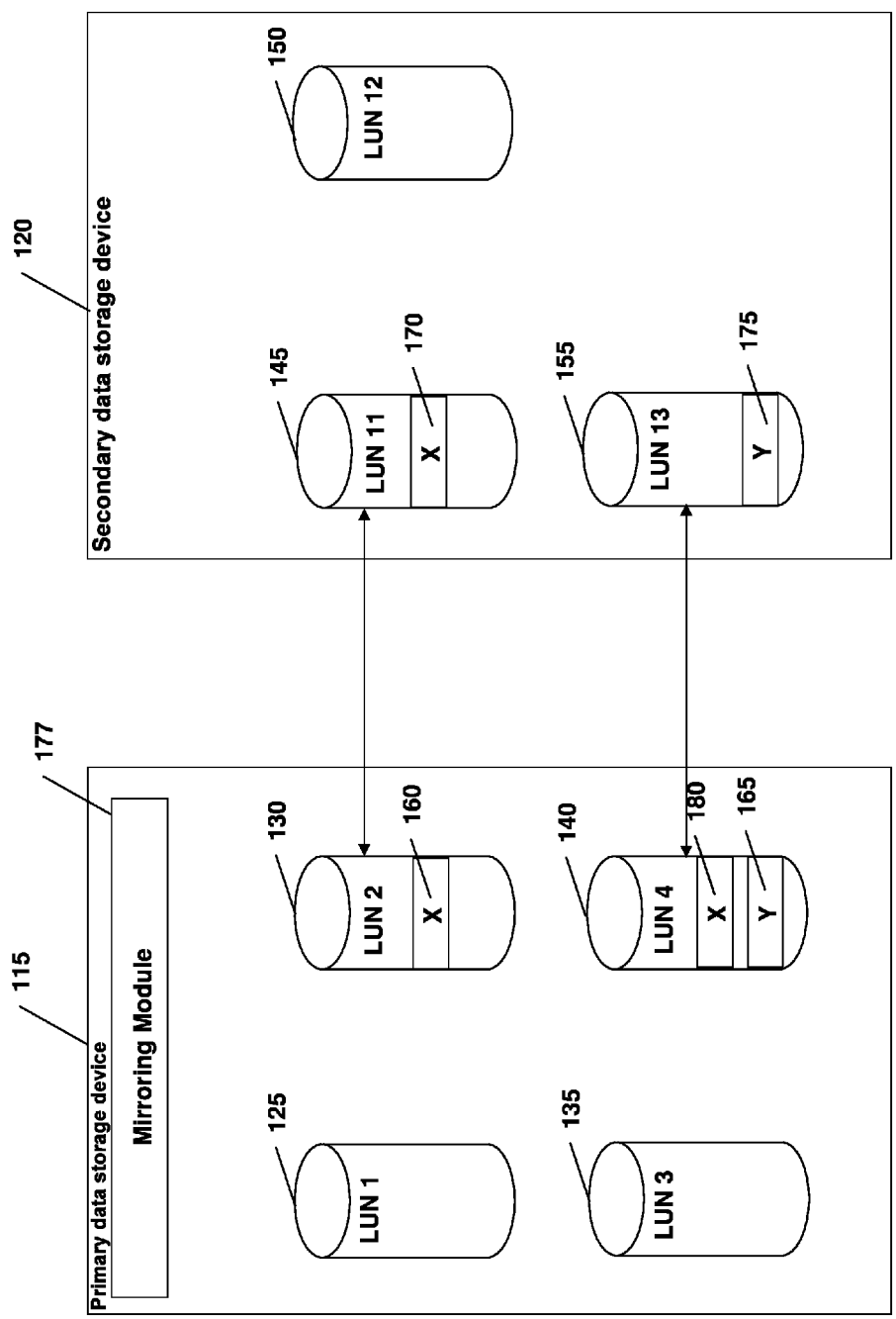
FIG. 1C depicts the primary data storage device and the secondary data storage device of FIG. 1B after a data portion is copied to the logical unit.

In some applications, the primary data storage device 115 can receive a copy command to copy, for example, the data portion 160 from the logical unit 130 to the logical unit 140. FIG. 1C depicts the primary data storage device 115 and the secondary data storage device 120 of FIG. 1B after the data portion 160 is copied to the logical unit 140. After receiving the copy command, the primary data storage unit 115 can copy the data portion 160 from the logical unit 130 to the logical unit 145 to create data portion 180.

In the illustrated embodiment, the logical unit 155 on the secondary data storage device 120 mirrors the logical unit 140 on the primary data storage device 115. In order to maintain the mirroring relationship between the logical unit 140 and the logical unit 155, a copy of the data portion 180 can be made on the logical unit 155. As described above, the data portion 180 is a copy of and identical to the data portion 160. The data portion 160 is identical to the data portion 170 due to the mirroring relationship between the logical unit 130 and the logical unit 145. Accordingly, the data portion 170 is identical to the data portion 180. Therefore, a data portion identical to the data portion 180 can be created on the logical unit 155 by copying the data portion 170 to logical unit 155.

Figure 1D:
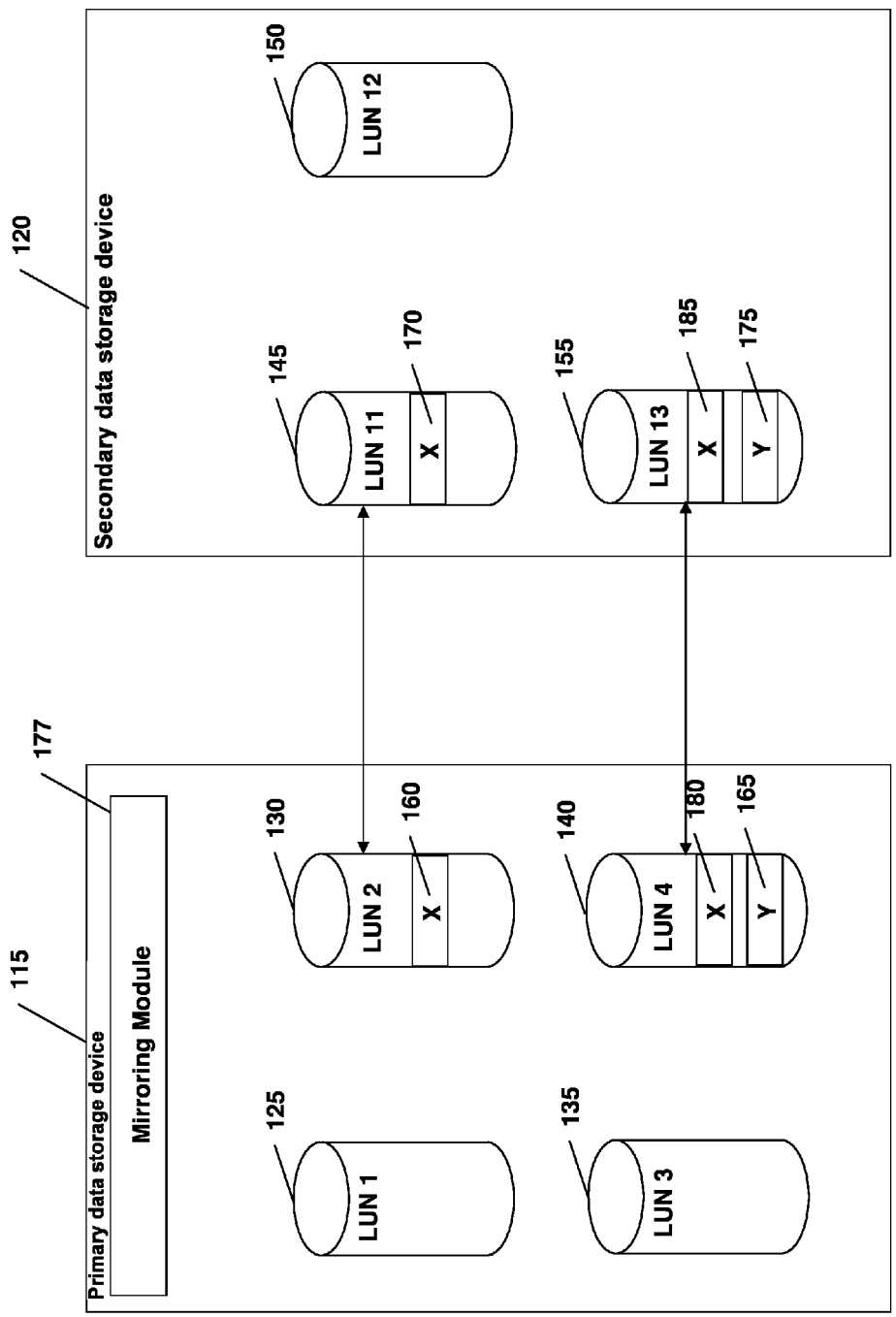
FIG. 1D depicts the primary data storage device and the secondary data storage device of FIG. 1C after a data portion is copied to the logical unit of the primary data storage system.

As described above, the primary storage device 115 can determine the mirroring relationships between logical units on the primary storage device 115 and the secondary storage device 120. For example, the primary data storage device can determine that the logical unit 145 on the secondary data storage device 120 mirrors the logical unit 130 and that the data portion 170 is identical to the data portion 160. Similarly, the primary data storage device can determine that the logical unit 155 on the secondary data storage device 120 mirrors the logical unit 140. Because the data portion 160 is mirrored by the secondary data storage device 120 and logical unit 140 is also mirrored by the secondary data storage device, the primary data storage device can cause a data portion identical to the data portion 180 to be created on the logical unit 155 of the secondary data storage device 120 without sending the data portion 180 to the secondary data storage device 120. In some embodiments, the primary data storage device 115 can send a command to the secondary data storage device 120 to copy the data portion 170 to the logical unit 155. FIG. 1D depicts the primary data storage device 115 and the secondary data storage device 120 of FIG. 1C after the data portion 170 is copied to the logical unit 155, creating data portion 185.

In some embodiments, the primary storage system 115 copying the data portion 160 to the logical unit 140 can occur substantially in parallel with the secondary data storage device 120 copying the data portion 170 to the logical unit 155. For example, the primary data storage device 115 can send a command to the secondary data storage device 120 to copy the data portion 170 to the logical unit 155 before copying the data portion 160 to the logical unit 140.

In some embodiments, the secondary data storage device delays performing the copy until a pre-determined event. For example, upon receiving a command to copy the data portion 170 to the logical unit 155, the secondary storage device 120 can delay copying the data portion 170 to the logical unit 155 until the data portion 170 is accessed or just prior to the data portion 170 being changed.

In some embodiments, the primary data storage device 115 and the secondary data storage device 120 can be asynchronously mirrored. The primary data storage device 115 can determine that the logical unit 145 on the secondary data storage device 120 asynchronously mirrors the logical unit 130. The primary data storage device 115 can determine whether the data portion 170 is identical to the data portion 160 (e.g., whether an asynchronous update has occurred making data portion 170 identical to the data portion 160). If the data portion 170 is identical to the data portion 160, the primary data storage device 115 can send a command to the secondary data storage device 120 to copy the data portion 170 to the logical unit 155.

Figure 2:
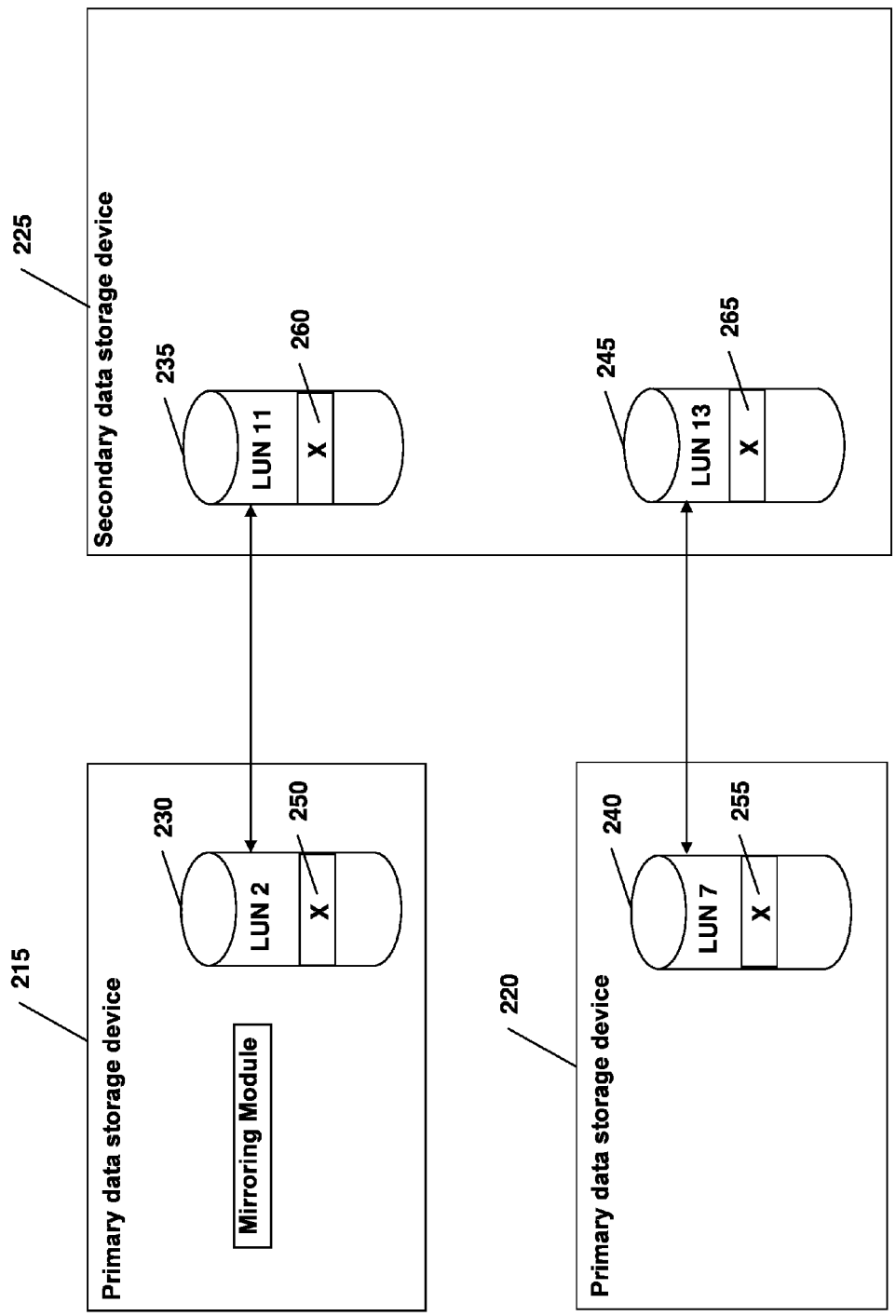
FIG. 2 depicts a first primary data storage device, a second primary data storage device, and a secondary data storage device.

The methods, computer readable media, and systems described herein can be used in other mirroring configurations. For example, a secondary data storage device can mirror two or more primary data storage devices. FIG. 2 depicts a first primary data storage device 215, a second primary data storage device 220, and a secondary data storage device 225. In the illustrated example, a logical unit 230 on the first primary data storage device 215 is mirrored by a logical unit 235 on the secondary data storage device 225. A logical unit 240 on the second primary data storage device 220 is mirrored by a logical unit 245 on the secondary data storage device 225.

The first primary data storage device 215 can receive a copy command to copy a data portion 250 stored on the first primary data storage device 215 to a logical unit 240 on the second primary data storage device 220. The copy command can cause a data portion 255 to be created. To maintain the mirroring relationship between the logical unit 240 and the logical unit 245, a copy of the data portion 255 can be made on the logical unit 245. Similar to the previously described embodiments, data portion 265 can be created on the logical unit 245 by copying the data portion 260 to the logical unit 245. Accordingly, a copy of data portion 255 is created on logical unit 245 without resending the data segment 255 to the secondary data storage device 225.

Figure 3:
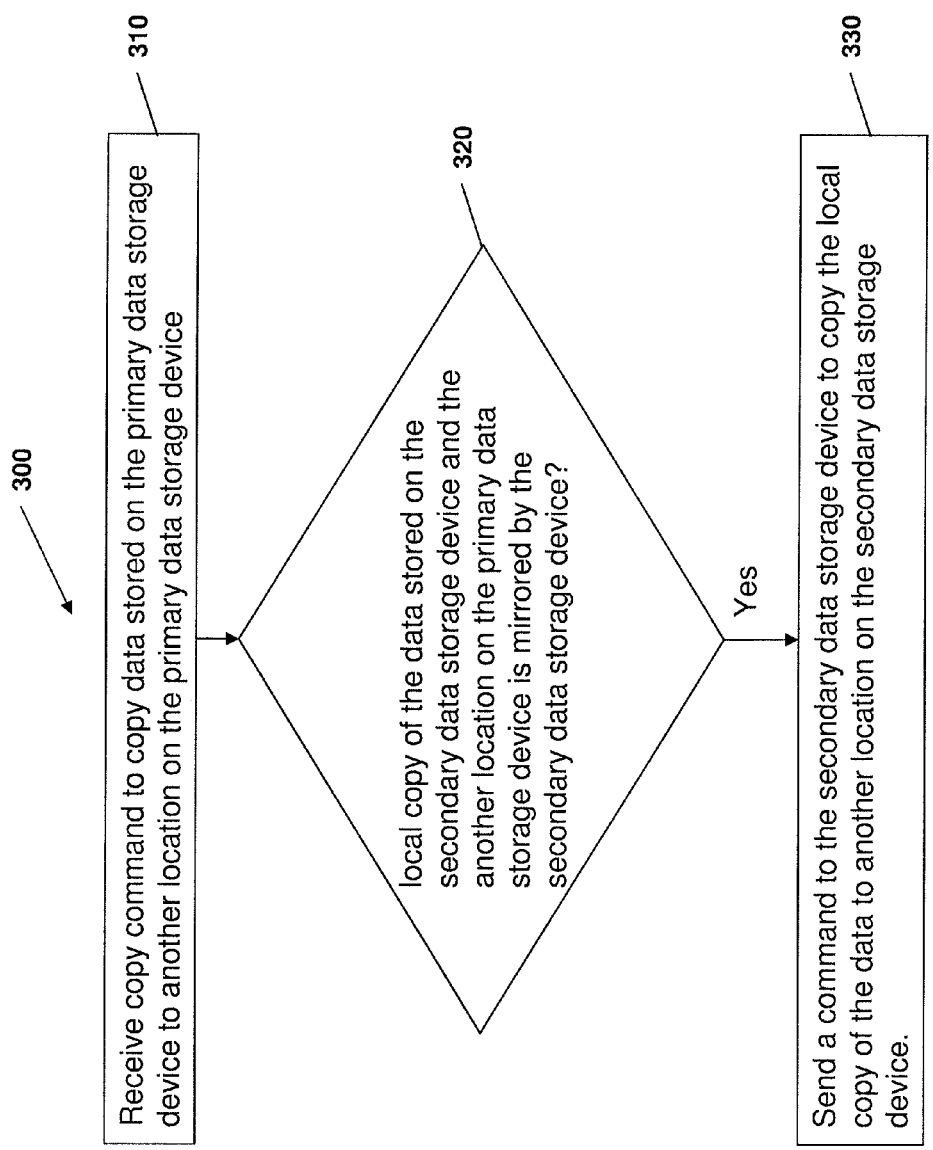
FIG. 3 depicts a flow chart illustrating a process for reducing the data transmitted between mirrored data storage devices when copying data on the primary data storage device.

FIG. 3 depicts a flow chart 300 illustrating a process for reducing the data transmitted between mirrored data storage devices when copying data on the primary data storage device. At step 310, the primary data storage device 115 receives a copy command to copy a data portion stored on the primary data storage device to another location on the primary data storage device. For example, the command can be to copy the data portion 160 from the logical unit 130 to the logical unit 140. In some embodiments, the command can be to copy data from a logical unit on the primary data storage device to the same logical unit.

At step 320, it is determined whether a local copy of the data portion is stored on the secondary data storage device 120 and whether the another location on the primary data storage device 115 is mirrored by the secondary data storage device 120. In some embodiments, the primary data storage device 115 includes the mirroring module 177 and can determine whether a copy of the data portion 160 is stored on the secondary data storage device 120 based on stored information about the mirroring relationship between logical units on the primary data storage device 115 and the secondary data storage device 120. Using the same information, the primary data storage device 115 can determine whether the logical unit 140 is mirrored by the secondary data storage device 120. In some embodiments, the mirroring module can be part of a separate device that is in communication with the primary data storage device 115 and the secondary data storage device 120.

If a local copy of the data portion is stored on the secondary data storage device 120 and the another location on the primary data storage device 115 is mirrored by the secondary data storage device 120, a command can be sent to the secondary data storage device 120 to copy the local copy of the data portion to another location on the secondary data storage device 120 at step 330. For example, as described above, the primary data storage device can send a command to the secondary data storage device 120 to copy the data portion 170 to the logical unit 155 before copying the data portion 160 to the logical unit 140.

While some embodiments described above use logical-unit-based mirroring, the methods, computer readable media, and systems described can be used for implementing mirroring on another basis, such as, for example, file-based mirroring. In applications using file-based mirroring, a mirroring module maintains the mirroring relationship between a primary data storage device and a secondary data storage device on a per-file basis. The primary data storage device can receive a copy command to copy a file stored on the primary data storage device to another location on the primary data storage device. The mirroring module can determine whether a local copy of the file is stored on the secondary data storage device and whether the another location on the primary data storage device is mirrored by the secondary data storage device. If a local copy of the file is stored on the secondary data storage device and the another location on the primary data storage device is mirrored by the secondary data storage device, a command can be sent to the secondary data storage device to copy the local copy of the file to another location on the secondary data storage device.

While this invention has been particularly shown and described with references to preferred embodiments thereof, it will be understood by those skilled in the art that various changes in form and details can be made therein without departing from the spirit and scope of the invention as defined by the appended claims.

The invention claimed is:

1. A method comprising:

receiving a copy command, at a primary data storage device, to copy a data portion stored on the primary data storage device to another location on the primary data storage device, the data portion being stored on a first logical unit of the primary data storage device, the another location on the primary data storage device being a second logical unit of the primary data storage device;

having received the copy command, copying the data portion from the first logical unit to the second logical unit of the primary data storage device;

determining, with a mirroring module, based on stored information about predetermined mirroring relationships between logical units on the primary data storage device and a secondary data storage device, whether the first logical unit of the primary data storage device is to be mirrored by the secondary data storage device, and whether the second logical unit of the primary data storage device is to be mirrored by the secondary data storage device;

having determined that the first logical unit of the primary data storage device is to be mirrored by the secondary data storage device, creating a mirror copy of the first logical unit on the secondary data storage device, including sending at least the data portion stored on the first logical unit to the secondary data storage device, a local copy of the data portion being stored in the mirror copy of the first logical unit on the secondary data storage device;

having determined that the second logical unit of the primary data storage device is to be mirrored by the secondary data storage device, creating a mirror copy of the second logical unit on the secondary data storage device, including copying the local copy of the data portion stored in the mirror copy of the first logical unit to the mirror copy of the second logical unit on the secondary data storage device, the copying of the data portion including sending, from the mirroring module, a second command to the secondary data storage device to copy the local copy of the data portion stored in the mirror copy of the first logical unit to the mirror copy of the second logical unit;

pairing the first logical unit of the primary data storage device and the mirror copy of the first logical unit on the secondary data storage device as a first mirror pair; and pairing the second logical unit of the primary data storage device and the mirror copy of the second logical unit on the secondary data storage device as a second mirror pair.

2. The method of claim 1, wherein the copy command is an EXTENDED COPY SCSI command.

3. The method of claim 1, wherein the first logical unit and the second logical unit are the same logical unit of the primary data storage device.

4. The method of claim 1, further comprising:

if the local copy of the data portion is stored in the mirror copy of the first logical unit on the secondary data storage device and the second logical unit of the primary data storage device is to be mirrored by the secondary data storage device, delaying copying, with the secondary data storage device, the local copy of the data portion to the mirror copy of the second logical unit on the secondary data storage device until an occurrence of a predetermined event.

5. The method of claim 4, wherein the predetermined event is one of (1) accessing the local copy of the data portion stored in the mirror copy of the first logical unit on the secondary data storage device, and (2) modifying the local copy of the data portion stored in the mirror copy of the first logical unit on the secondary data storage device.

6. A computer program product, tangibly embodied in a non-transitory computer readable storage medium, including instructions being operable to cause one or more data processing apparatus to:

receive a copy command, at a primary data storage device, to copy a data portion stored on the primary data storage device to another location on the primary data storage device, the data portion being stored on a first logical unit of the primary data storage device, the another location on the primary data storage device being a second logical unit of the primary data storage device;

having received the copy command, copy the data portion from the first logical unit to the second logical unit of the primary data storage device;

determine, with a mirroring module, based on stored information about predetermined mirroring relationships between logical units on the primary data storage device and a secondary data storage device, whether the first logical unit of the primary data storage device is to be mirrored by the secondary data storage device, and whether the second logical unit of the primary data storage device is to be mirrored by the secondary data storage device;

having determined that the first logical unit of the primary data storage device is to be mirrored by the secondary data storage device, create a mirror copy of the first logical unit on the secondary data storage device, including sending at least the data portion stored on the first logical unit to the secondary data storage device, a local copy of the data portion being stored in the mirror copy of the first logical unit on the secondary data storage device;

having determined that the second logical unit of the primary data storage device is to be mirrored by the secondary data storage device, create a mirror copy of the second logical unit on the secondary data storage device, including copying the local copy of the data portion stored in the mirror copy of the first logical unit to the mirror copy of the second logical unit on the secondary data storage device, the copying of the data portion including sending, from the mirroring module, a second command to the secondary data storage device to copy the local copy of the data portion stored in the mirror copy of the first logical unit to the mirror copy of the second logical unit;

pair the first logical unit of the primary data storage device and the mirror copy of the first logical unit on the secondary data storage device as a first mirror pair; and pair the second logical unit of the primary data storage device and the mirror copy of the second logical unit on the secondary data storage device as a second mirror pair.

7. The computer program product of claim 6, wherein the copy command is an EXTENDED COPY SCSI command.

8. The computer program product of claim 6, wherein the first logical unit and the second logical unit are the same logical unit of the primary data storage device.

9. The computer program product of claim 6, further including instructions being operable to cause one or more data processing apparatus to:
  if the local copy of the data portion is stored in the mirror copy of the first logical unit on the secondary data storage device and the second logical unit of the primary data storage device is to be mirrored by the secondary data storage device, delay copying, with the secondary data storage device, the local copy of the data portion to the mirror copy of the second logical unit on the secondary data storage device until an occurrence of a predetermined event.

10. A method comprising:
  receiving a copy command, at a first primary data storage device, to copy a data portion stored on the first primary data storage device to a location on a second primary data storage device, the data portion being stored on a logical unit of the first primary data storage device, the location on the second primary data storage device being a logical unit of the second primary data storage device;
  having received the copy command, copying the data portion from the logical unit of the first primary data storage device to the logical unit of the second primary data storage device;
  determining, with a mirroring module, based on stored information about predetermined mirroring relationships between logical units on the primary data storage device and the secondary data storage device, whether the logical unit of the first primary data storage device is to be mirrored by a secondary data storage device, and whether the logical unit of the second primary data storage device is to be mirrored by the secondary data storage device;
  having determined that the logical unit of the first primary data storage device is to be mirrored by the secondary data storage device, creating a mirror copy of the logical unit of the first primary data storage device on the secondary data storage device, including sending at least the data portion stored on the logical unit of the first primary data storage device to the secondary data storage device, a local copy of the data portion being stored in the mirror copy of the logical unit of the first primary data storage device on the secondary data storage device;
  having determined that the logical unit of the second primary data storage device is to be mirrored by the secondary data storage device, creating a mirror copy of the logical unit of the second primary data storage device on the secondary data storage device, including copying the local copy of the data portion stored in the mirror copy of the logical unit of the first primary data storage device to the mirror copy of the logical unit of the second primary data storage device on the secondary data storage device, the copying of the data portion including sending, from the mirroring module, a second command to the secondary data storage device to copy the local copy of the data portion stored in the mirror copy of the logical unit of the first primary data storage device to the mirror copy of the logical unit of the second primary data storage device;
  pairing the logical unit of the first primary data storage device and the mirror copy of the logical unit of the first primary data storage device on the secondary data storage device as a first mirror pair; and
  pairing the logical unit of the second primary data storage device and the mirror copy of logical unit of the second primary data storage device on the secondary data storage device as a second mirror pair.

11. The method of claim 10, wherein the copy command is an EXTENDED COPY SCSI command.

12. A computer program product, tangibly embodied in a non-transitory computer readable storage medium, including instructions being operable to cause one or more data processing apparatus to:
  receive a copy command, at a first primary data storage device, to copy a data portion stored on the first primary data storage device to a location on a second primary data storage device, the data portion being stored on a logical unit of the first primary data storage device, the location on the second primary data storage device being a logical unit of the second primary data storage device;
  having received the copy command, copy the data portion from the logical unit of the first primary data storage device to the logical unit of the second primary data storage device;
  determine, with a mirroring module, based on stored information about predetermined mirroring relationships between logical units on the primary data storage device and the secondary data storage device, whether the logical unit of the first primary data storage device is to be mirrored by a secondary data storage device, and whether the logical unit of the second primary data storage device is to be mirrored by the secondary data storage device;
  having determined that the logical unit of the first primary data storage device is to be mirrored by the secondary data storage device, create a mirror copy of the logical unit of the first primary data storage device on the secondary data storage device, including sending at least the data portion stored on the logical unit of the first primary data storage device to the secondary data storage device, a local copy of the data portion being stored in the mirror copy of the logical unit of the first primary data storage device on the secondary data storage device;
  having determined that the logical unit of the second primary data storage device is to be mirrored by the secondary data storage device, create a mirror copy of the logical unit of the second primary data storage device on the secondary data storage device, including copying the local copy of the data portion stored in the mirror copy of the logical unit of the first primary data storage device to the mirror copy of the logical unit of the second primary data storage device on the secondary data storage device, the copying of the data portion including sending, from the mirroring module, a second command to the secondary data storage device to copy the local copy of the data portion stored in the mirror copy of the logical unit of the first primary data storage device to the mirror copy of the logical unit of the second primary data storage device;
  pair the logical unit of the first primary data storage device and the mirror copy of the logical unit of the first primary data storage device on the secondary data storage device as a first mirror pair; and
  pair the logical unit of the second primary data storage device and the mirror copy of logical unit of the second primary data storage device on the secondary data storage device as a second mirror pair.

13. The computer program product of claim 12, wherein the copy command is an EXTENDED COPY SCSI command.

* * * * *